3,312,542
ENHANCING GROWTH RATE OF PLANTS WITH POLYALKOXYLATED DERIVATIVES OF RICINOLEIC ACID TRIGLYCERIDES

Eugene D. Kitzke, South Milwaukee, and Phillip J. Neumiller, Racine, Wis., assignors to S. C. Johnson & Son, Inc., Racine, Wis.
No Drawing. Filed Nov. 1, 1963, Ser. No. 320,857
5 Claims. (Cl. 71—2.7)

This invention is concerned with agricultural compositions and methods. More particularly, it is concerned with methods for enhancing the growth rate of plants and with methods and compositions for enhancing the activity of plant regulants. The compositions used in this invention comprise polyalkoxylated derivatives of ricinoleic acid triglycerides.

It has been found in accordance with this invention that when plants are contacted with the compositions of this invention the growth rate of the plant is increased. Moreover, if the composition also contains a plant regulant such as a growth promoter or a dwarfing agent, the properties of the plant regulant are improved. When, for example, two compositions containing identical concentrations of a dwarfing agent only one of which contains a polyethoxylated triglyceride of this invention are identically tested for dwarfing activity, the composition containing the glyceride derivative is found to be more effective in the production of dwarf plants.

The active ingredients of the compositions used in this invention are either derivatives of ricinoleic acid triglycerides in which the ethoxylate content of the triglyceride is from about 60% to about 70% by weight. They are prepared by reaction of the triglyceride with ethylene oxide according to known methods. Alkoxylated derivatives of other hydroxy acid glycerides in which the acid moiety contains from twelve to sixteen carbon atoms are also useful, but it is preferred to utilize the ricinoleic acid derivative because it is naturally occurring and not too expensive. While the active ingredients are defined herein as ethoxylated derivatives of ricinoleic acid triglycerides, it will be appreciated that the compositions may contain minor amounts of mono or diglycerides of polyethoxylated ricinoleic acid and may even contain minor amounts of other glycerides, especially those derived from acids closely related to ricinoleic acid such as oleic acid and stearic acid. As is well known, compositions of this nature are generally derived from various naturally occurring fats and oils and only very rarely is it economical to prepare absolutely pure compositions.

The plants to be treated are contacted with an effective amount of one or more active ingredients in admixture with an acceptable carrier or extending agent which will have no adverse effect upon the plant in accordance with standard agricultural practice. The preferred carrier is water. Desirably the active ingredients are taken up in water and the resulting aqueous composition sprayed on the plants. Alternatively, they may be dispersed and applied to the plant in other extending agents either liquid, semi-solid or solid.

The terms "carrier" and "extending agent" as used herein include any and all of those agriculturally acceptable extending agents in which the compounds of the instant invention are dispersed, for example the solvent of a true solution, the liquid phase of suspensions, emulsions or aerosols, the semi-solid carriers of ointments and the solid phase of dusts, powders and granules.

The term "dispersed" is used herein in its widest possible sense. When it is said that the active agents of this invention are dispersed it means that the particles may be molecular in size and held in true solution in a suitable solvent. It means also that the particle may be colloidal in size and dispersed in and throughout a liquid phase in the form of a suspension or an emulsion. It also includes particles which are dispersed in a semi-solid viscous carrier such as lanolin or petrolatum in which they may be actually dissolved or merely suspended. The term "dispersed" also includes particles which are mixed with and spread throughout a solid carrier so that the mixture is in the form of a powder, dust or granules. It also includes mixtures which are suitable for use in aerosols in which the active ingredients are dissolved or suspended in a suitable extending agent and packed in a pressurized container for dispelling by the pressure of a compressed gas such as nitrogen or a normally liquid hydrocarbon or halogenated hydrocarbon such as propane or a Freon.

There are a number of liquid extending agents other than water which can be utilized to prepare the compositions of this invention. High boiling oils of vegetable origin such as castor oil or olive oil are suitable. Low boiling more volatile liquids such as acetone, cyclohexanone, carbon tetrachloride, ethylene dichloride, solvent naphtha, kerosene and the like are also suitable.

The compositions may employ organic or inorganic extending agents. Solid compositions may be prepared using for example tricalcium phosphate, calcium carbonate, kaolin, bole, kieselguhr, talcum, calcined magnesia, boric acid and others. Materials of vegetable origin such as ground cork, wood, walnut shells, corncobs, sugar bagasse, pine bark, peanut hulls and cocoa hulls are also useful.

The agents of this invention may be dispersed in pastes, ointments or other viscous compositions by the use of such semi-solid extending agents as lanolin and petroleum jelly.

Aerosol compositions are especially useful to the home or amateur gardner.

It has been found that the compositions of this invention in which the active compounds are dispersed in extending agents at concentrations of 0.01% by weight or even lower are particularly effective in increasing the growth rate of plants and for enhancing the effect of plant regulants. However, the concentration is not critical since compositions containing extremely low concentrations will give useful results.

The compositions when applied to plants will generally contain at least 0.01% by weight of the active ingredient although as aforesaid, less concentrated solutions even as low as 0.001% by weight will produce beneficial results and this latter may be considered a practical minimum. The compositions may be provided at these concentrations or at higher concentrations for example 1% by weight. Alternatively, highly concentrated compositions ready for dilution at the point of use may be prepared.

The preferred dosage requirement varies with the structure of the active ingredient, plant species, effect to be achieved and the time of application. When application is by spraying, the liquid will preferably contain from about 0.01% to 0.1% by weight of the triglyceride and the plant is sprayed to drop off. At concentrations less than 0.01% by weight, it may not be possible to achieve the optimum dosage by spraying to drop off and at concentrations above 1% by weight, the optimum dosage may be unnecessarily exceeded. The same concentration ranges are generally preferred for solids and semi-solid compositions such as dusts, granules and ointments. However, to achieve the same result with the same plants under the same conditions, more concentrated semi-solid or solid dispersions are required than with liquids.

A particular advantage of ointments is that exact quantities of active agent can be applied to each plant on an individual basis by spreading a measured quantity of ointment of known concentration on each plant. A similar advantage pertains to dust although some activity may be lost by the composition dropping to the ground.

Growth promoting agents within the scope of this invention may be represented by the formula

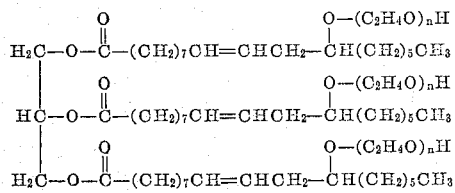

wherein $n$ is an integer from 10 to 18. In compounds where $n$ is from 10 to 18 the ethoxylate content by weight is from 60% to 70%, and while all compounds of this class are active, best results for most applications are obtained at an ethoxylate content close to 70%, for example 65% to 70% by weight. It has been found that compounds in which the ethoxylate content is as low as 50% by weight actually repress the growth rate of plants.

While the exact mechanism by which the agents of this invention operate is not known, the chemical structure appears to be extremely important. Closely related compounds have been tested and found to be inactive or even toxic.

The compositions of this invention do not necessarily produce larger plants. They increase the growth rate of the plants. This is a most important agricultural consideration which suggests many economic advantages. By their use, entirely new crops may be grown in areas where heretofore a short growing season has prevented their maturation. In those areas where the growing season is relatively longer, two complete crops per growing season are possible. In greenhouse opertions, the overall annular produce can be markedly increased. The growth term for fodder crops can be decreased and the land turned to direct market crops.

In addition to their remarkable growth enhancing properties, the agents of this invention have also been found capable of stimulating the activity of growth regulants. Compositions as described above can be prepared to include growth regulants such as dwarfing agents, systemic insecticides, growth promoters, agents to enhance root formation or inhibit abscission or other plant regulants and these will be more effective than similar compositions containing only the plant regulant.

A number of agricultural tests have been carried out to establish the remarkable properties of the compositions used in this invention. These have included flower assays, callus assays, vegetable growth tests, elongation tests and others. In all these tests marked improvements were observed in the plants treated in accordance with this invention when compared with control plants. For example, in mung bean root tests in which treatment with aqueous compositions containing 0.01% and 0.1% by weight respectively of a compound of the above formula in which $n$ is eighteen was compared with identical treatments in which no active agent was utilized an enhancement of from 40% to 78% over the controls was observed. The tests which were designed to be statistically significant were carried out as follows:

Mung bean (*Phaseolus aureus*) cuttings consisting of 7 cm. sections of etiolated decapitated hypocotyl were placed in test tubes containing solutions of test materials. After six days roots were counted and totalled for each treatment. Differences in root numbers indicated effective treatments as compared to other controls.

*Plant material.*—Mung bean seeds were soaked in running water for 24 hours. Seeds were then planted in flats of vermiculite and placed in an incubator at a constant temperature of 26° C. in complete darkness. After 96 hours in incubation, etiolated seedings were decapitated below the cotyledonary node. The remaining etiolated hypocotyl stem and root system were returned to the incubator for 24 hours. After final incubation, the cuts were taken consisting of 7 cm. sections of etiolated hypocotyl.

*Procedure.*—Cuttings 7 cm. long of similar cross-section dimensions were selected. These cuttings were placed in 15 x 115 mm. test tubes containing 5 ml. of test solution. Test solutions were prepared by diluting test materials with sterile deionized water. A minimum of 10 replicates were used per test. Subsequently, the test tubes were placed in racks and placed under continous illumination from 40 watt cool white fluorescent lights. A mean temperature of 80° F. was maintained. After six days under these conditions, the hypocotyl sections were evaluated for rooting and counting.

*Evaluation of treatment.*—A number of roots on each cutting was counted and totalled for treatments. These totals were compared to untreated control sections which were identically treated except for the presence of the active agent to demonstrate effective treatment.

Similar results were obtained with these and other triglycerides within the scope of this invention having an ethoxylate content of from 60% to 70% by weight.

As stated above, the active agents of this invention are also useful in enhancing the activity of plant regulants. For example, in a plant elongation test using Xanthium (*Xanthium pennsylvanicum* Waller), as the test plant, the epicotyl height of plants treated with 0.1% by weight aqueous mixture of a polyethoxylated ricinoleic acid triglyceride having an ethoxylate content of 70% by weight and also containing the growth promoter gibberellic acid at the usual concentrations recommended for this agent is much greater than the epicotyl height of plants identically treated except that the mixtures contained no polyethoxylated alcohol. If a dwarfing agent is used in place of the gibberellic acid, the dwarfing effect is similarly enhanced. The plant regulant O-isopropyl-N-(3-chlorophenyl) carbamate is more effective in the prevention of sprout formation during storage when it is utilized in a composition of this invention. The plant regulants are used at the same concentration generally recommended as effective in ordinary compositions, although lower concentrations can be used.

The following is a partial list of plant regulants whose properties are improved when used in the compositions of this invention. The list as will be recognized contains compounds useful as herbicides, growth promoters, dwarfing agents, sprout prevention agents, root stimulation agents, plant growth arresters, flowering control agents, abscission inhibitors and others: 2,4-dichlorophenoxylacetic acid; gibberellin; O-isopropyl-N-(3-chlorophenyl) carbamate; 2-isopropyl-4-dimethylamino-5-methylphenyl-1-piperidinecarboxylate methyl chloride; indoleacetic acid; 2,4,5-trichlorophenoxylacetic acid; indolebutyric acid; 1,2-dihydro-3,6-pyridazine-dione; methyl ester of naphthaleneacetic acid; (2-chloroethyl) trimethylammonium chloride; 2,4-dichlorobenzyltributylphosphonium chloride; N-6-benzylademine; 3-isopropyl - 4 - dimethylamino-6-methylphenyl - 1 - piperidinecarboxylate methyl chloride; 2,3,5-triiodobenzoic acid; phenyl mercury acetate; β-naphthoxy acetic acid; and α-naphthalene acetic acid.

As a matter of convenience, it is preferable to apply the polyethoxylated compounds in compositions which also contain the plant regulants, but it is not essential to do so. They may be applied separately and there may even be a substantial time interval, for example 48 hours between application of the alcohol derivative and the plant regulant regardless of which might be applied first. However, even at time intervals of 48 hours or longer, the effect of the plant regulant is enhanced by the presence of the triglyceride previously or subsequently applied so that having regard to the effects achieved, the compositions may be considered as being administered simultaneously.

It will be understood by those skilled in the art that various modifications may be made without departing from the spirit and scope of this invention and it is intended to cover all such claims and modifications in the appended claims.

What is claimed is:

1. A method of enhancing the growth rate of plants which comprises contacting the plant with a composition containing at least 0.001% by weight of a polyethoxylated derivative of ricinoleic acid triglyceride in an amount sufficient to effect said enhancement, the ethoxylate content of the derivative being from about 60% to 70% by weight.

2. A method of enhancing the growth rate of plants which comprises contacting the plant with a composition containing at least 0.001% by weight of polyethoxylated derivative of ricinoleic acid triglyceride in an amount sufficient to effect said enhancement, the ethoxylate content of the derivative being from about 60% to 70% by weight and an agriculturally acceptable liquid extending agent.

3. A method of enhancing the growth rate of plants which comprises contacting the plant with a composition containing at least 0.001% by weight of a polyethoxylated derivative of ricinoleic acid triglyceride in an amount sufficient to effect said enhancement, the ethoxylate content of the derivative being from about 60% to 70% by weight and an agriculturally acceptable semi-solid extending agent.

4. A method of enhancing the growth rate of plants which comprises contacting the plant with a composition containing at least 0.001% by weight of a polyethoxylated derivative of ricinoleic acid triglyceride in an amount sufficient to effect said enhancement, the ethoxylate content of the derivative being from about 60% to 70% by weight and an agriculturally acceptable solid extending agent.

5. A method of enhancing the growth rate of plants which comprises contacting the plant with an aqueous composition containing at least 0.001% by weight of a polyethoxylated derivative of ricinoleic acid triglyceride in an amount sufficient to effect said enhancement, the ethoxylate content of the derivative being from about 60% to 70% by weight.

References Cited by the Examiner

UNITED STATES PATENTS

| | | | |
|---|---|---|---|
| 2,321,736 | 1/1943 | Du Puis et al. | 71—2.7 X |
| 2,614,919 | 10/1952 | Warren et al. | 71—2.6 |
| 2,842,051 | 7/1958 | Brian et al. | 71—2.5 |
| 3,117,856 | 1/1964 | Darlington | 71—2.7 |

FOREIGN PATENTS

| | | |
|---|---|---|
| 719,445 | 12/1954 | Great Britain. |
| 815,510 | 6/1959 | Great Britain. |

OTHER REFERENCES

Jansen et al.: Weeds, vol. 9, 1961, pages 381 to 405 (pages 390 and 391 particularly relied upon).

LEWIS GOTTS, *Primary Examiner.*

JAMES O. THOMAS, Jr., *Examiner.*